United States Patent

[11] 3,588,559

| [72] | Inventor | Peter Fono<br>Anaheim, Calif. |
| --- | --- | --- |
| [21] | Appl. No. | 844,773 |
| [22] | Filed | July 25, 1969 |
| [45] | Patented | June 28, 1971 |
| [73] | Assignee | North American Rockwell Corporation |

[54] INDUCTOR GENERATOR STRUCTURE
22 Claims, 8 Drawing Figs.

[52] U.S. Cl. .................................................. 310/168,
310/268
[51] Int. Cl. ........................................................ H02k 17/42
[50] Field of Search ........................................ 310/168,
268, 112, 68, 184, 185, 155, 146, 169

[56] References Cited
UNITED STATES PATENTS

| 529,918 | 11/1894 | Kelly ............................. | 310/168 |
| 563,427 | 7/1896 | Steinmetz ..................... | 310/168X |
| 3,215,876 | 11/1965 | Michols et al. ................ | 310/268X |

*Primary Examiner*—D. F. Duggan
*Attorneys*—William R. Lane, Allan Rothenberg and Sidney Magnes ABSTRACT: An electric generator having a plurality of axial air gaps which are formed by respective horseshoe magnets, preferably electromagnets, disposed evenly around a circle so that a toothed iron rotor will have its teeth pass through the air gaps as the rotor rotates. The number of magnets is preferably twice the number of teeth on the rotor. Through alternate magnets is threaded a toroidal coil and through the other magnets is threaded another toroidal coil. As a tooth enters an air gap of a horseshoe magnet, the flux surrounding the particular coil passing through the magnet will increase and then the flux decreases as the tooth moves out, producing a voltage pulse in the particular coil. Since as a particular tooth moves through the air gaps the pulse is produced first in one coil and then the other, the two coils are coupled together to produce an alternating voltage.

INVENTOR.
PETER FONO
BY
Sidney Magnes

INVENTOR.
PETER FONO
BY
Sidney Magnes

INVENTOR.
PETER FONO

BY

Sidney Magnes

INDUCTOR GENERATOR STRUCTURE

INTRODUCTION

It is well known that electrical machinery is widely used as motors, and as generators of electrical power; and that there is a trend for present day machines to become progressively smaller, lighter, and more powerful. These machines are also operating at progressively higher temperatures and speeds. In most cases, the rotating portions thereof are exposed to high-magnitude stresses that tend to limit the maximum permissible speed of the machines; and, generally speaking, this tends to limit their power capabilities. Moreover, their magnetic paths tend to be objectionably long; thus further limiting their power capabilities.

OBJECTS AND DRAWINGS

It is therefore an object of this invention to provide an improved electrical machine suitable for motor or generator application.

This object, and others, will be realized from the following detailed description, taken in conjunction with the drawings of which.

BACKGROUND

Electrical machines of the subject type contain two basic elements: the first is stationary, and is known as a "stator"; and the second rotates, and is known as a "rotor"—these elements being linked by a magnetic field, whose form depends upon the type of machine. When a machine of the above type is to be used as an electric generator, an external driver (such as a gasoline engine, a turbine, or the like) spins the rotor; and the rotating movement, acting in conjunction with a magnetic field, generates electric power. When—on the other hand—a machine of the above type is to be used as a motor, the magnetic field is used to produce an attraction and/or a repulsion between various portions of the stator and the rotor; so that the rotor is continuously revolved, and delivers mechanical power.

Generally speaking, a given machine can be used as a motor or as a generator—although frequently its structure can be optimized for either of these uses.

Most prior-art electrical machines of these types have used a rotor/stator arrangement that caused the useful magnetic "flux" or the airgap to extend in a radially outward direction from the shaft. Other types of machines have used a rotor/stator arrangement that caused the useful magnetic flux or the airgap to extend axially in a direction parallel to the shaft. In general, the axial-type machines have an inherent advantage in that they can rotate slower than equivalent radial-type machines.

SYNOPSIS

Briefly stated, the disclosed device causes rotor teeth to pass between sets of stator teeth that are selectively linked to armature windings. In the generator mode of operation, the rotor teeth modify the magnetic flux; causing the armature windings to produce an output voltage. In the motor mode of operation, the magnetic flux attracts the rotor teeth to the armature teeth; a DC voltage acting to nullify the magnetic flux at adjacent stator teeth, in order to minimize interference with rotor teeth movement.

BASIC STRUCTURE

Figure 1:
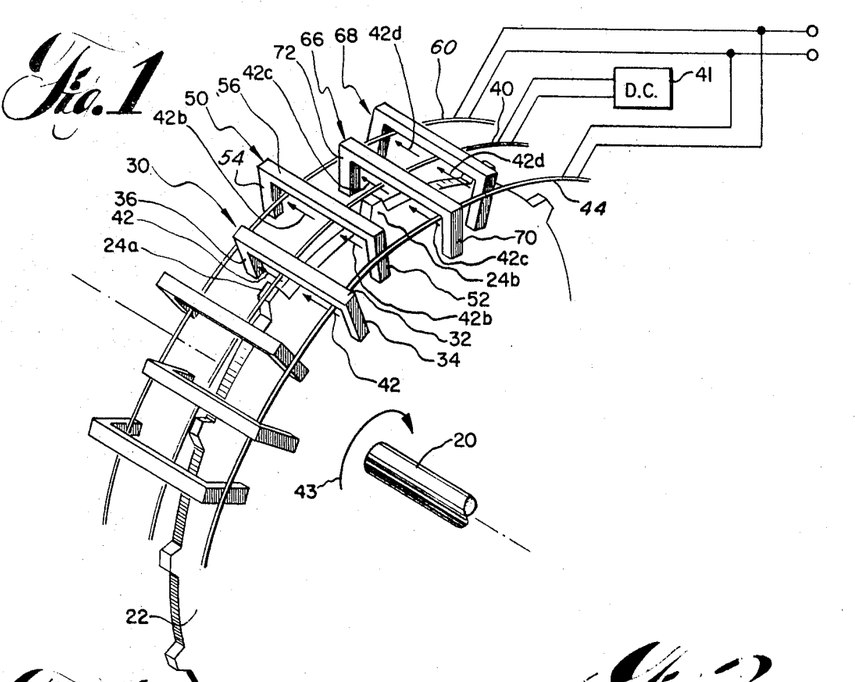
FIG. 1 shows a basic arrangement.

The basic operation of the disclosed apparatus will be understood from the simplified illustration of FIG. 1. This drawing is oversimplified for the purpose of explanation; but basically shows a shaft 20 that has a planar disclike rotor 22 affixed perpendicularly to the shaft, and rotating therewith. Rotor disc 22 preferably comprises a single, unitary structure formed or assembled to the desired size and configuration. Rotor disc 22 is similar to a cogwheel structure; contains along its periphery a plurality of outwardly extending rotor teeth 24a, 24b, etc.—these teeth, their spacing, construction, and purpose being explained later.

Straddling the outer periphery of rotor 22 is a first fixedly positioned stator element 30 illustrated as being U-shaped; and having a yoke portion 32 and a pair of side portions 34 and 36. Stator element 30 is formed of magnetic material that readily "conducts" magnetic flux; and it forms part of a magnetic loop that comprises side portion 36, yoke portion 32, side portion 34, and the airgap between adjacent surfaces of side portions 34 and 36.

When "energized" (in a manner to be described later) stator element 30 acts in the manner of the well-known "horseshoe" magnet; and produces a concentrated magnetic flux across the airgap between its side portions 34 and 36. For reasons that will become apparent later, side portions 34 and 36 will be called "stator teeth."

A first toroidal winding, shown as an electrical conductor 40 is threaded through stator element 30, as shown in FIG. 1, it being well known that—under certain conditions—an electrical conductor (40) carrying an electric current produces an encircling magnetic field that "links" a suitably shaped and positioned structure (such as stator element 30). If electrical conductor 40 is assumed to carry a DC electric current—for example, from DC source 41—into the plane of the paper i.e., from left to right, it is well known that its resultant magnetic field will have a polarity within the airgap as indicated by arrows 42; and the resultant magnetic flux will encircle the electrical conductor 40.

It is well known that magnetic flux tends to select the path of minimum magnetic "reluctance"; so that—when electrical conductor 40 is energized—the resultant magnetic flux tends to form a magnetic loop that utilizes the low magnetic reluctance (or "magnetic" material) of stator element 30. The magnetic flux may be considered to enter stator tooth 36 to traverse stator yoke 32 and stator tooth 34, and traverses the airgap as indicated by arrow 42—in this way using the magnetic material of stator element 30 in order to produce a magnetic path of minimum magnetic reluctance. It should be noted that an "axial" magnetic field (see arrows 42) parallel to shaft 20 is produced in the airgap between stator teeth 34 and 36.

Electrical conductor 40 may comprise a single wire, a plurality of wires, or any other suitable arrangement; for convenience it will be designated as a "field" coil or a "field" winding. The teeth 24a, etc. of disc 22 will be designated "rotor" teeth—since they are on the movable element, the rotor; and side portions 34 and 36 of the stator element will be designated as "stator teeth" because of their correspondence to the rotor teeth.

GENERATOR OPERATION

Generally speaking, electrical machinery of the subject type can be used interchangably as either a motor or as a generator. Therefore, for simplicity of explanation, the subject machine will first be described in its "generator" mode of operation—in conjunction with the above explanation and the illustration of FIG. 1.

Assume that field coil 40 is carrying DC current, and is producing a substantially constant magnetic flux of the polarity discussed above; that rotor 22 is being rotated (by an external driver) not shown in the direction indicated by arrow 43; and that rotor tooth 24a is in the position illustrated—i.e., approaching, but not yet aligned with stator teeth 34, 36. At this moment the magnetic flux path contains a relatively long airgap between stator teeth 34 and 36; and, because the magnetic reluctance of air is quite large, there is a relatively small density of magnetic flux traversing the magnetic loop and the yoke portion 32 of stator element 30.

As rotor 22 is rotated by the external driver, rotor tooth 24a approaches stator teeth 34 and 36; and the magnetic flux digresses from the direct high reluctance airgap path between stator teeth 34 and 36, in order to go through the low reluctance rotor tooth 24a—rather than through the high reluctance airgap. In other words, the total airgap is smaller and the reluctance around the path, including element 30, is at a minimum. The lower reluctance of the modified magnetic path permits a higher density of magnetic flux to traverse stator element 30.

Movement of the rotor tooth 24a into the airgap progressively increases the magnetic flux traversing stator element 30; until the rotor tooth 24a is directly aligned with the stator teeth 34 and 36—at which time the magnetic reluctance of the loop is at a minimum; so that the magnetic flux is maximum.

As rotor disc 22 continues to rotate, the rotor tooth 24a begins to emerge from the far side of stator element 30; thus again increasing the magnetic reluctance, and decreasing the density of the magnetic flux. In this way, the movement of disc 22 causes the total magnetic flux to gradually increase, and to then decrease.

It will be noted that a second toroidal winding, shown as an electrical conductor 44 (designated as an "armature" coil or an armature winding) is also threaded through stator element 30; and it is known as the total magnetic flux varies in stator element 30, the varying magnitude magnetic flux will induce a varying voltage in linked electrical conductor 44. Therefore, the movement of disc 22 generates a varying voltage in electrical conductor 44.

Referring again to FIG. 1, it will be seen that this illustration shows a second stator element 50, second stator element 50 being similar to the one previously described—and comprising stator teeth 52 and 54, and a stator yoke 56; and forming an airgap that is aligned with the airgap of the first stator element 30. One other similarity should be noted. Electrical conductor 40 has the same spatial relation to both stator elements 30 and 50; so that it magnetically links both of them, and induces into stator element 50 a similar magnetic flux as was previously described in connection with the first stator element 30. Arrows 42b indicate the direction of the flux in the airgap of element 50.

On the other hand, the previously discussed armature winding 44 does not traverse (link) the second stator element 50; rather, it passes externally of the second stator element 50. This produces a difference that will be discussed later. Stator element 50, with a varying voltage in nonlinked armature winding 44 since the winding does not pass therethrough.

It should be noted, however, that a third armature winding, shown as an electrical conductor 60 does traverse the second stator element 50, but does not traverse the first stator element 30.

To continue the discussion of the generating mode of operation, as rotor 22 is being driven in the indicated direction, rotor tooth 24a eventually passes through the airgap of the first stator element 30; and eventually approaches and passes through the aligned airgap of the second stator element 50. This movement of rotor tooth 24a now changes the magnetic reluctance of the second stator element 50 in the same manner as previously described; so that the second stator element 50 induces a varying voltage in its linked armature winding 60—but not in nonlinked armature winding 44. (Incidentally, this also explains why the first stator element 30 does not induce a varying voltage in nonlinked armature winding 60.)

In this way, a rotor tooth such as 24a causes individual sequential varying voltage to appear at the separate armature windings 44 and 60.

Figure 2:
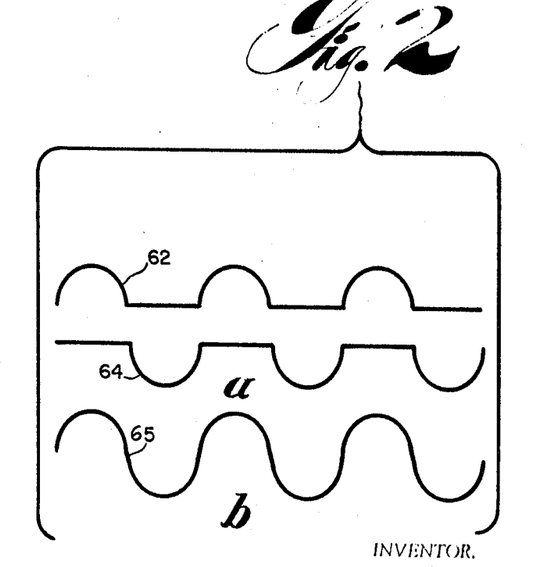
FIG. 2 shows a generated waveform.

In order to combine the waveforms generated in electrical conductors 44 and 60, one of the electrical conductors has its output wires connected in such a way (see FIG. 1) that its output peak is reversed in polarity relative to the output peak of the other electrical conductor. Therefore, as shown in FIG. 2a, one of the electrical conductors produces "positive" peaks 62, and the other electrical conductor produces "negative" peaks 64; these being combined into a composite waveform 65 of FIG. 2b. By suitable spacing, etc. the composite waveform 65 may be made sinusoidal.

Referring back to FIG. 1, it will be noted that the first stator element 30 is actually one of a set of stator elements (30, 66 etc.) that etc.) are suitably spaced to encircle the rotor—all of the stator elements of this set being similarly linked by electrical conductors 40 and 44; and that the second stator element 50 is likewise one of a second set of stator elements (50, 68, etc.) that are also suitably spaced to encircle the rotor—all of the stator elements of this set being similarly linked by electrical conductors 40 and 60. Thus, stator elements of the two sets are in alternation with the stator elements of one set staggered in an axial direction with respect to the stator elements of the other set.

As a particular rotor tooth (say 24a) generates the varying voltage discussed above, and shown in FIG. 2; a corresponding rotor tooth 24b is cooperating with sequential stator element of the same set to simultaneously produce a similar varying voltage in the same winding; and other rotor teeth are cooperating with other stator elements of the same set to cause the induce voltages to aid each other or add.

As the rotor rotates, the rotor teeth subsequently coact with the stator element of the second set.

In this way, flux pulsation in these stator elements induce varying voltages 62 and 64 into respective conductors 44 and 60; these voltages being added together to produce the composite waveform illustrated in FIG. 2b. Thus, as the various rotor teeth pass sequentially through the aligned airgaps of the various stator elements, the electrical conductors alternately produce voltages that are applied to the common output terminals—the disclosed device thus acting as an electrical generator.

MOTOR OPERATION

It was previously pointed out that, generally, electric machines of the subject type may be used as either generators or motors; and the "motor" operation of the disclosed device will now be explained. It should be realized that, for motor operation the rotor is not driven by an external source; rather electrical power causes the motor to rotate.

For convenience, the operation of stator element 30 of FIG. 1 will be considered first. This drawing shows that DC is applied to field coil 40, so that a substantially constant magnetic flux is produced at the airgap between stator teeth 34 and 36, as indicated by the arrows 42.

Figure 3:
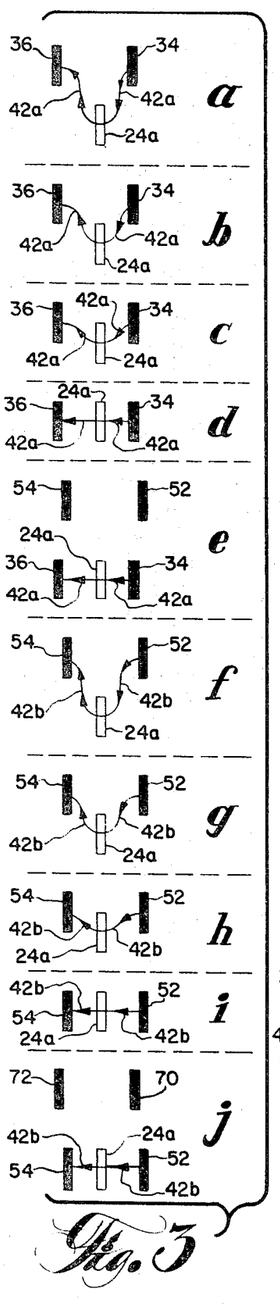
FIG. 3 shows a motive tooth being attracted into sequential airgaps.

Attention is now directed to FIG. 3, which shows in symbolic form, a straightened out "linear" representation of the fixedly positioned stator teeth and one movable rotor—tooth 24a; these being positioned to correspond to FIG. 1. It is seen, in FIG. 3a, that stator teeth 34 and 36 are aligned due to their structure; and that rotor tooth 24a is shown as being displaced from stator teeth 34 and 36.

In FIG. 3a, the magnetic flux (indicated by arrows 42a) has a choice of taking a short high reluctance airpath between stator teeth 34 and 36, or of taking a somewhat longer but lower reluctance path—by passing through the magnetic material of rotor tooth 24a. As shown by arrows 42a, a portion of the flux takes the lower reluctance path, and passes through rotor tooth 24a.

As is well known, magnetic fluxes tend to follow the path of minimum magnetic reluctance; and may be considered as being similar to stretched rubber bands that are trying to shorten and straighten themselves out. In FIG. 3a, the magnetic flux (indicated by arrows 42a) in an attempt to shorten the magnetic path, acts like a stretched rubber band. The result is shown in FIG. 3b, wherein this shortening effect has moved rotor tooth 24a closer to alignment with stator teeth 34 and 36; and in doing so has (A) shortened the magnetic path, and (B) slightly rotated the tooth carrying rotor disc. The progressive shortening effect of magnetic flux 42a is shown in FIGS. 3c and 3d; the rotor tooth 24a approaching, and eventually becoming aligned with stator teeth, 34 and 36, as shown in FIG. 3d. In this way, the magnetic flux produced by field coil 40 causes the rotor to rotate until its tooth 24a is aligned with stator element 30 of FIG. 1; i.e., the rotor tooth in the vicinity of the airgap is attracted, and drawn into the airgap—and the motor has rotated a given amount.

Since stator element 30 is merely one stator element of a set, and rotor tooth 24a is merely one rotor tooth of a set, each associated rotor tooth and stator element acts in the manner described; thus producing a strong rotational force that rotates the motor, and causes the eventual alignment of the rotor teeth with the stator teeth.

In order to explain the next step in the motor operation, attention is redirected to FIG. 1, and to the fact that the second stator element 50 is positioned behind the previously discussed stator element 30. Referring back to FIG. 3e, this drawing illustrates this relationship; and also shows the airgap between stator teeth 52 and 54 of the next stator element. FIG. 3e also shows in addition, the aligned gaps of stator elements 30 and 50. In actuality, FIGS. 3d and 3e are equivalent, except that FIGS. 3e additionally shows the adjacent stator teeth 52 and 54 of the second stator element (50).

Assume, for the moment, that in FIG. 3e, the above-discussed magnetic flux between stator teeth 34 and 36 is removed; and an equivalent magnetic flux 42b appears instead between stator teeth 52 and 54 of the second stator element 50, the resultant flux path being shown in FIG. 3f. It will be seen that FIG. 3f corresponds to FIG. 3a previously discussed, except that stator teeth 52, 54 of the second stator element are now operative instead of the stator teeth of the first stator element. The previously described stretched elastic band effect, illustrated in FIGS. 3f—3i now cause rotor tooth 24a to be pulled into alignment with stator teeth 52 and 54 of the second stator element 50, as indicated in FIG. 3i; in this way causing the rotor to revolve another finite amount.

FIG. 3j is similar to FIG. 3i (also to FIGS. 3e and 3f) except that is shows a pair of subsequent stator teeth, 70 and 72, that are next activated to cause additional rotation of motive tooth 24a; this additional rotation taking place in the manner described above. Thus, by sequentially energizing successive stator elements, a rotor tooth may be continuously moved from one position to another.

As rotor tooth 24a sequentially passes through the aligned gaps, as described above, the entire group of rotor teeth similarly passes through corresponding airgaps—thus producing augmented motive power.

In the foregoing explanation, it was pointed out that adjacent stator elements are to be energized sequentially; and that once a stator element had performed its function, it was assumed to be deenergized (otherwise it would produce an undesirable backward effect). In the disclosed device, the stator elements are not actually deenergized; rather, their magnetic flux effect is cancelled. This is achieved as follows.

Figure 4:
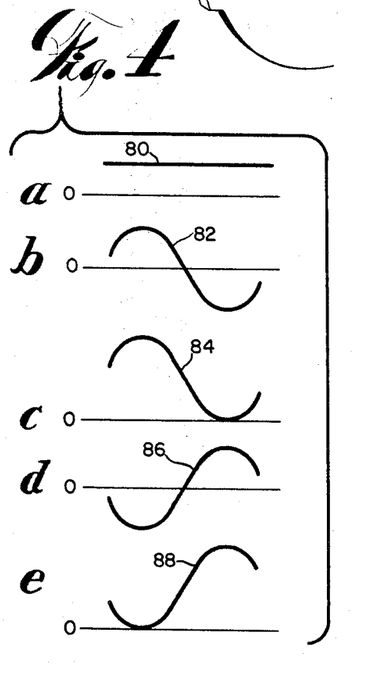
FIG. 4 shows magnetic flux waveforms.

First of all, it should be recalled that field winding 40 of FIG. 1 is energized by a DC; and causes its linked stator element 30 to produce a magnetic flux 42 having a constant value and direction. This constant value constant direction magnetic flux is illustrated graphically at 80 in FIG. 4a.

It will also be realized that if a sinusoidal voltage is applied to armature winding 44 of FIG. 1, it would cause its linked stator element 30 to produce a sinusoidal magnetic flux, indicated at 82 of FIG. 4b. When two waveforms 80 and 82 of FIGS. 4a and 4b are combined, a composite magnetic flux appears—shown at 84 of FIG. 4c; and it should be noted that this composite magnetic flux 84 varies from an augmented value to substantially zero. Thus, the composite magnetic flux 84 has a basically unidirectional characteristic; and this varying composite magnetic flux 84 appears in the airgap between stator teeth 34 and 36 during the above-described motor operation.

If a similar sinusoidal waveform—but of reversed polarity, as shown at 86 of FIG. 4d—is applied to the other armature winding (60), it would cause its linked stator 50 of FIG. 1 to produce an opposite polarity sinusoidal magnetic flux indicated at 86 of FIG. 4d. When the two waveforms 80 and 86 of FIGS. 4a and 4d are combined, a composite magnetic flux appears—shown at 88 of FIG. 4e; and it should be noted that this composite magnetic flux 88 also varies from an augmented value to substantially zero. Thus, the magnetic flux 88 also has a basically unidirectional characteristic; and this varying composite magnetic flux 88 appears in the airgap between stator teeth 52 and 54 during the above-described motor operation.

To recapitulate, due to the linking of stator element 30 and electrical conductor 44, magnetic flux 84 appears in the airgap stator element 30; and due to the linking of stator element 50 and electrical conductor 60, magnetic flux 88 appears in the airgap of stator element 50. It should be noted that fluxes 82 and 88 are out of phase; so that when the flux at stator element 30 is at a maximum value, the flux at stator element 50 is at a minimum. Thus, when stator element 30 is energized for motor action, and its adjacent stator element 50 is deenergized—i.e., its magnetic flux effect is cancelled.

It will be recalled from FIG. 1 and the previous description, that the first armature coil 44 is associated with a set of stator elements which include stator element 30; so that all the stator elements (30, 66, etc.) associated with that set have a maximum magnetic flux in their airgaps. Similarly the second armature coil 60, is associated with a second set of stator elements that include stator element 50; so that all of the stator elements (50, 68, etc.) associated with the second set have a minimal magnetic flux in their airgaps. In this way the sets of stator elements provide each energized stator element with a pair of deenergized neighbor stator elements.

The above-described flux cancellation of adjacent stator elements justifies the previous assumption, and permits the operation to occur as discussed in connection with FIG. 3.

It will be noted from FIG. 4 that the peaks of composite magnetic fluxes 84 and 88 alternate timewise in polarity; this result having been obtained by reversing the connections to one of the armature windings and energizing both windings 44 and 60 from the same AC power source. Due to this alternation—at a subsequent instant—the stator elements of the second set will have maximum magnetic fluxes in their airgaps, while the stator elements of the first set will have minimal magnetic fluxes in their airgaps. At this time, the rotor teeth will be attracted out of alignment with the stator elements of the first set, and into alignment with the stator elements of the second set. Thus, periodic reversals of fluxes 84 and 88 will progressively rotate the motor.

While the above explanation has been given in terms of sinusoidal waveforms, so-called "square" waves, pulses, etc. may be used. However, sinusoidal waves are readily available or easily generated, and require simpler circuitry; and it can be shown that their sloping sides provide smoother transition between the operation of adjacent stator elements.

A number of extremely advantageous results are obtained from the disclosed arrangement. First as may be seen from FIGS. 4c and 4e, the composite flux 84 at the first set of stator elements is at a maximum value at the same time that composite flux 88 at the second set of stator elements is at a minimum value. Therefore (referring to FIGS. 1, 3a—3d, 4c and 4e) while the rotor tooth 24a is being drawn into alignment with stator teeth 34 and 36, there is practically no interfering magnetic flux between stator teeth 52, 54. Similarly referring to FIGS. 1, 3f—3i, 4c and 4e because composite flux 88 is at a maximum value at the same time that composite flux 84 is at a minimum value, while rotor tooth 24a is being drawn into alignment with stator teeth 52, 54, there is no interfering magnetic flux between stator teeth 34, 36. Thus, the magnetically caused movement is quite efficient.

A second advantage results because of the unidirectional characteristic of the magnetic flux. The rotor teeth 24a, 24b, etc.—regardless of their locations—always "see" a magnetic flux of the same polarity; and this minimizes electric and magnetic losses.

A third advantage is that minimal magnetic hysteresis losses result from this structure. Referring back to FIG. 1, it may be understood that as rotor tooth 24a leaves stator element 30, its increasing distance, its increasing airgap and the decreasing magnitude of the applied sinusoidal waveform combine to decrease the magnetic flux through the rotor tooth. However, rotor tooth 24a is approaching stator element 50; and its decreasing distance, the decreasing airgap, and the increasing magnitude of the sinusoidal waveform, all combine to increase the magnetic flux through the rotor tooth. Thus, by suitably spacing the stator elements, the flux through the rotor tooth may be made substantially constant; and this constancy further minimizes magnetic hysteresis losses.

Other advantages are that the coils 40, 44, and 60 (in an arrangement such as illustrated in FIG. 1) are toroidal in form, and are therefore easy to manufacture; and, since only the rotor moves, the stationary coils are not exposed to any centrifugal force that may tear them apart. The single moving element is the rotor; and this may be of a strong unitary construction that is lightweight and small, so that it easily withstands the effect of centrifugal force.

Since the rotor acts primarily as a switch that merely switches magnetic flux to sequential stator elements, it does not have to carry any windings, brushes, or the like; and may therefore be structurally simple.

Due to the rotor's lightweight compact form, the resultant motor/generator is readily stopped accelerated, or decelerated; and easily achieves changes in speed for those operations where this is desirable. It will be recognized, in the motor operation, that the speed of rotor movement is controlled by the frequency of the energizing voltage applied to the armature windings, so that adjusting this frequency will control rotor speed. As indicated above, the low inertia of the rotor provides a device that quickly changes its speed in accordance with the frequency changes.

A review of FIG. 1 shows that the magnetic paths are short, and may be of generously sized cross section, thus further minimizing magnetic losses. A later disclosed embodiment will indicate how the magnetic path may be further shortened, and improved.

It will be noted, from FIG. 1, that only alternate stator elements are simultaneously energized; and that so the number of rotor teeth is chosen to place one rotor tooth adjacent each energized stator element. This means that there are no rotor teeth under the unenergized stator element. This arrangement has the advantage that as a rotor tooth emerges from its alignment, all the forces of the now energized subsequent stator elements urge the rotor teeth to continue to rotate in the same direction.

It will be recalled that in the disclosed device, the rotor teeth are drawn into alignment with sequential stator elements. Therefore, the disclosed device is not limited to rotation of the rotor; i.e., the "rotor" and the stator elements may form a linear arrangement. One of these may be mounted on a device such as a car of a train—the other (stator teeth) being mounted along the track. The above-described operation will draw the various rotor teeth, or motive teeth, into alignment with sequential stators; and thus produce movement.

FIG. 1 shows an array comprising two sets of stator elements that are staggered in order to cause electrical conductor 44 to link only the first set of stator elements, and not link the second set; and to cause electrical conductor 60 to link only the second set of stator elements, and not link the first set—electrical conductor 40 linking both sets of stator elements. The advantage of this staggered stator arrangement is that it simplifies the structure of the electrical conductors; these may be planar, straight, regularly curved, toroidal, or the like.

Figure 5:
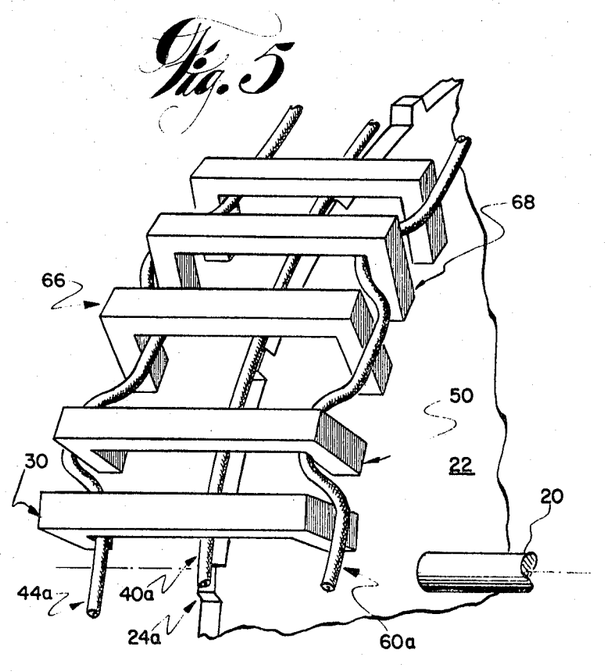
FIG. 5 shows an embodiment wherein the stator elements are aligned, and the electrical conductors zigzag to provide the desired configuration.

Under some conditions, factors other than simplified windings may be more important; and FIG. 5 illustrates another arrangement. Here, stator elements 30, 50, 66, 68, are aligned; and the conductors 44a and 60a zigzag in order to link their respective stator elements. The advantage of this array is that it simplifies the positioning and placement of the stator elements. Of course, in either case, the gaps are aligned for passage of the rotor teeth; and the operation is the same as previously described.

INCREASED POWER EMBODIMENT

Figure 6:
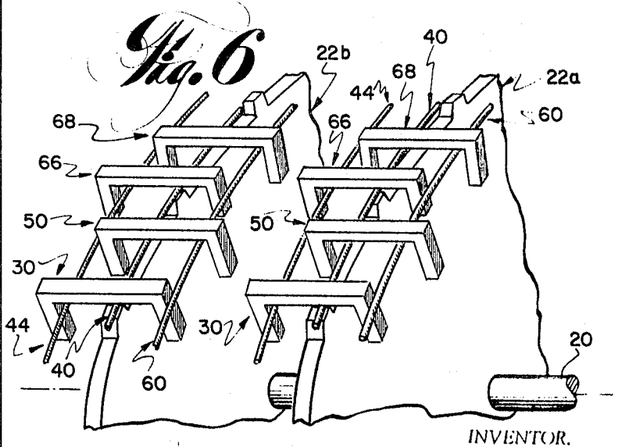
FIG. 6 shows a doubled-power arrangement.

In order to increase the power capability of the machine previously described, it should be recalled that FIGS. 1 and 5 showed an array comprising two sets of stator elements, three coils, and a rotor; these components cooperating in the way described above. FIG. 6 shows how twice the power capability may be achieved—by adding a duplicate array that comprises two sets of stator elements, three coils, and an additional rotor disc. Both rotors are affixed to shaft 20; and each assembly acts individually in the manner previously described—so that twice as much power is produced.

Figure 7:
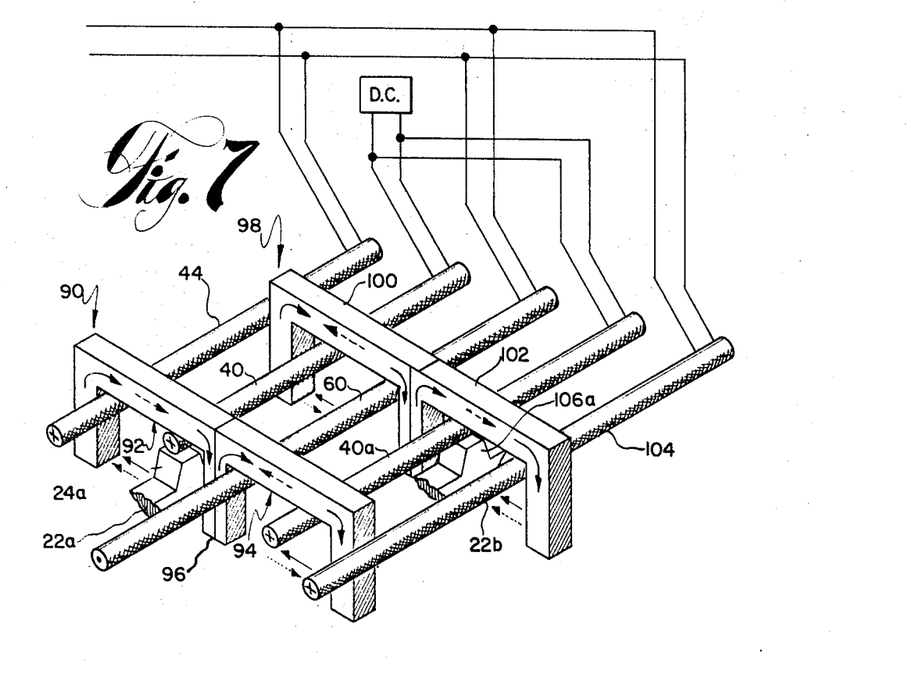
FIG. 7 shows an improved doubled-power arrangement.

A more efficient arrangement for increased power is shown in FIG. 7. This embodiment is similar to the previously disclosed arrangement, and comprises an E-shaped "dual" stator element 90, having a "primary" C-shaped portion 92 and a "secondary" C-shaped portion 94—the primary and secondary C-shaped portions 92 and 94 sharing a common side portion 96, and thus forming an E-shaped stator element 90.

Referring first to primary portion 92, it will be noted that the primary portion 92 has a "primary" airgap, and that the secondary portion 94 has "secondary" airgap; these airgaps conducting the magnetic flux as previously described. Also, the primary and secondary portions 92 and 94 have individual magnetic paths, except for the common side portion 96 as indicated. Primary portion 92 of the dual stator element has a field coil 40, an armature coil 44, and a rotor disc 22a; these elements being positioned and linked to operate as discussed previously.

Attention is now directed to secondary portion 94 of the dual stator; and it will be noted that this is similar to the primary portion previously described—having a field coil 40a, an armature coil 60, and a rotor disc 22b; these elements being positioned and linked to operate as discussed previously. Another armature coil 104, which will be discussed later, is shown.

It will be noted that FIG. 7 also shows a second E-shaped dual stator element 98, also having a primary portion 100, and a secondary portion 102—these being similar to those previously described. In the second dual stator, primary portion 100 has a field coil 40 (in common with primary portion 92) and an armature coil 60 (in common with secondary portion 94). The secondary portion 102 has a field coil 40a (in common with secondary portion 94) and an armature coil 104.

The following discussion will be directed to the cooperation of the primary and secondary portions; and it should be noted that armature coil 60 serves a dual purpose, in that it affects primary portion 100 and secondary portion 94 by passing alternately through the primary and secondary airgaps. (The other windings act in the manner previously described.)

Assume that, at a given instant, the device of FIG. 7 is acting as a motor with the various windings conducting electric current as indicated by the "plus" signs and by the "dots"—the plus signs indicating that the electric current is flowing through that coil into the plane of the paper (away from the viewer), and the dot indicating that the electric current is flowing through that coil out of the plane of the paper (toward the viewer). Under the assumed instantaneous condition of electric current flow, magnetic fluxes are induced, as indicated by the arrows; the solid-line arrows indicating the magnetic flux produced by field coils 40 and 40a, and the dotted line arrows indicating the magnetic fluxes produced by armature coils 44, 60, 104, coil 104 being connected to act as though it were part of coil 44.

Under the assumed instantaneous condition, the same direction arrows indicate that there is an augmented magnetic flux in the airgap of primary portion 92 and in the airgap of secondary portion 102; and these augmented magnetic fluxes draw the rotor teeth into alignment with their stator teeth. As indicated by the opposed direction arrows, in the airgaps of primary portion 100 and secondary portion 94, the nullified magnetic flux in these airgaps have a value of substantially zero. Therefore even though there are no rotor teeth in these airgaps, primary portion 100 and secondary portion 94 do not have any effect upon the rotor.

At a subsequent moment, the direction of the energizing voltage applied to armature coils 44, 60, and 104 will have reversed. An analysis of this new condition will shown that an augmented value of magnetic flux will now be associated with primary portion 100 and secondary portion 94; and that a value of substantially zero magnetic flux will be associated with portions 92 and 102. Thus, at a subsequent time, primary portion 100 and secondary portion 94 attract the rotor teeth; and produce rotation.

It will be apparent that two stator elements are simultaneously energized, thus producing twice as much power.

FIG. 7 is, of course, only a partial showing; and the complete device includes two sets of encircling dual stator elements (staggered as shown, or aligned with zigzag coils), and two rotors—each rotor having a plurality of rotor teeth—positioned on the same shaft, and straddled by the stator elements. For an even more powerful motor, additional rotors and corresponding stator sections may be used; so that simultaneous attraction is exerted on an even larger number of rotor teeth. The net result is that each of the rotors has its respective rotor teeth simultaneously drawn into alignment with respective stator elements; so that a more powerful effect is produced by the embodiment of FIG. 7.

It is obvious that the arrangement of FIG. 7 is twice as powerful as the embodiment shown in FIG. 1; and is more compact than that shown previously in FIG. 6. It uses fewer coils, and therefore has a smaller copperloss than the previous arrangement.

The embodiment of FIG. 7 also uses a more efficient magnetic path arrangement. As indicated, the magnetic flux through the rotor teeth and through the common side portion is of the unidirectional type; and thus minimizes magnetic losses. Moreover, it will be noted that the central leg 96 of the dual stator element carries magnetic flux for both the primary and secondary portions; but, it can be shown that this magnetic flux tends to remain constant, and at the same value as the flux in other portions of the magnetic paths. For example, at those times when primary portion 92 is carrying an augmented magnetic flux, secondary portion 94 has a flux value of substantially zero; so that the magnetic flux in the central leg 96 has the augmented value.

It can also be shown that during transient intervals (while the magnetic flux is increasing in one portion, and decreasing in the other portion) the magnetic flux in the central portion 96 remains substantially constant. It should also be noted that the polarity of magnetic flux in the central leg 96 remains the same. These characteristics permit leg 96 to have the same cross-sectional area as other parts of the magnetic circuit; and minimizes magnetic hysteresis losses.

In FIG. 7, it will be noted that the rotor teeth of the two separate rotor discs are offset by an amount that may be called "180 electrical degrees"; whereas the physical separation will of course be a function of the frequency, the number of stator elements, and other factors.

While the above description has been given in terms of motor operation, it will be apparent that the disclosed arrangement can also be used as a generator. Under the generator condition of operation, as the shaft is driven, the various rotor teeth and armature coils interact to produce an electric voltage.

The embodiment disclosed in FIG. 7 was shown to use two oppositely phased voltages, obtained by reversing the lead wires to coil 60; and may thus be considered to be a "two-phase" arrangement. Many electrical machines are designed to operate on "three phases," and it can be shown that the disclosed concepts can be extended to a three-phase arrangement.

MAGNETIC PATH

Figure 8:
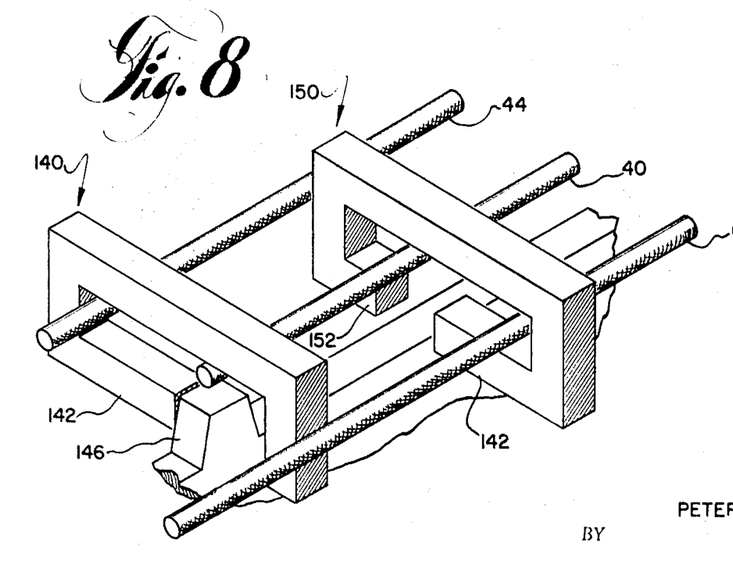
FIG. 8 shows improved stator elements.

It was pointed out above that the disclosed arrangement produced an exceptionally efficient magnetic path that was short, compact, and of suitable cross-sectional dimensions. An even more efficient magnetic arrangement is shown in FIG. 8, wherein stator element 140 is still substantially C-shaped; but now comprises a pole piece 142 that shortens the airgap; and whose face acts to concentrate magnetic flux in the area of the rotor tooth 146—rather than permitting the magnetic flux to follow a relatively uncontrolled path.

A somewhat different stator element 150 is shown behind stator element 140, and is illustrated as having an additional pole piece 152 (resulting in a G-shaped stator element) whose face acts to further concentrate the magnetic flux in the further shortened airgap.

It will be seen that stator elements 140 and 150 are laterally offset, relative to each other; but their airgaps are so positioned that the rotor teeth may pass through the aligned airgaps. Either or both pole piece configurations (140, 150) may be used in any of the previously described embodiments. As shown, these shapes permit the use of the described field coil 40 and two armature coils 44 and 60—all coils being in close proximity with the stator elements 140, 150. In this case, the interior space of the G-shape serves as a passageway for the electrical conductors, and produces a concentrated magnetic flux in a shortened airgap.

I claim:
1. The combination comprising:
   A. a first stator element having parallel pole faces forming an airgap, and a first low reluctance magnetic flux path made of a magnetic material connecting said pole faces thereof;
   B. a second stator element having parallel pole faces forming an airgap, and a second low reluctance magnetic flux path made of a magnetic material connecting said pole faces thereof;
   C. said stator elements mounted with their airgaps substantially aligned; and
   D. means for linking each of said stator elements by a different pair of electrical conductors, comprising:
      a. a first electrical conductor positioned in a linking relation with the magnetic flux path of said first stator element by being disposed between said airgap and said first low reluctance flux path thereof, and in a nonlinking relation with the magnetic flux path of said second stator element by being disposed in the region outside of the airgap and the second low reluctance flux path thereof;
      b. a second electrical conductor positioned in a linking relation with the magnetic flux path of said second stator element by being disposed between said airgap and said second low reluctance flux path thereof, and in a nonlinking relation with the flux path of the first stator element by being disposed in the region outside said airgap and said first low reluctance flux path thereof; and
      c. a third electrical conductor positioned in a linking relation with the magnetic flux paths of both said stator elements by being disposed between said air gaps and low reluctance flux paths thereof.

2. The combination of claim 1 including at least one motive tooth made of magnetic material and mounted for sequential movement through said aligned airgaps so as to lower the total reluctance of each respective stator element whenever said tooth is disposed within the airgap thereof.

3. The combination of claim 2 wherein said first stator element is one of a first set of stator elements; said second stator element is one of a second set of stator elements; said first electrical conductor links only the stator elements of said first set; said second electrical conductor links only the stator elements of said second set; said third electrical conductor links all the stator elements of both sets; and said motive tooth is one of a plurality of motive teeth mounted for sequential movement through said aligned airgaps.

4. The combination of claim 3 wherein the stator elements of one set are staggered relative to the stator elements of the other set, for providing straight paths for said electrical conductors.

5. The combination of claim 3 wherein said stator elements are aligned and said first and second electrical conductors are zigzag.

6. The combination of claim 3 wherein said electrical conductors are straight.

7. The combination of claim 3 wherein said electrical conductors are planar.

8. The combination of claim 3 wherein said electrical conductors are toroidal.

9. The combination of claim 3 wherein said stator elements and said electrical conductors form a linear configuration.

10. The combination of claim 3 including:
means for directing oppositely polarized electricity through said first and said second electrical conductors, for causing said first and second sets of stator elements to produce a varying magnetic flux across their airgaps, the composite magnetic flux in said airgaps produced by said first, second, and third electrical conductors, varying from a maximum value to value of substantially zero, said motive teeth being attracted during said maximum value interval, and being substantially unaffected during said substantially zero value interval—to produce a motor mode of operation.

11. The combination of claim 3 including:
means for causing said third electrical conductor to produce a substantially constant, uniform, unidirectional biassing magnetic flux across the airgaps of both said sets of stator elements;
means for causing said first electrical conductor to produce, across the gaps of said first set of stator element, a magnetic flux that varies periodically, for causing the composite magnetic flux produced at said airgaps by said first and third electrical conductors to vary from a maximum value to a value of substantially zero;
means for causing said second electrical conductor to produce, across the airgaps of said second set of stator elements, a magnetic flux that varies periodically, for causing the composite magnetic flux produced at said airgaps by said second and third electrical conductors to vary from a maximum value to a value of substantially zero; and
means for causing the magnetic flux variations at said airgaps of said first and second sets of stator elements to be out of phase.

12. The combination of claim 3 including:
means for directing DC electricity through said third electrical conductor for establishing a unidirectional magnetic flux across the airgaps of all said stator elements; and
means for moving said motive teeth sequentially through said airgaps for causing said movement to vary the magnetic flux in the magnetic paths of said stator elements, for causing said first and second electrical conductors to produce varying voltages—to produce a generator mode of operation.

13. The combination comprising:
I. a rotatable shaft;
II. a rotor disc positioned perpendicularly to said shaft, and adapted to rotate with said shaft;
 a. said rotor disc having a plurality of rotor teeth along its periphery;
III. a first stator element having parallel pole faces forming an airgap, and a low reluctance magnetic flux path connecting said pole faces thereof;
IV. a second stator element having parallel pole faces forming an airgap, and a low reluctance magnetic flux path connecting said pole faces thereof;
 a. said stator elements mounted with their airgaps substantially aligned for permitting passage of said rotor teeth through said airgaps;
V. a first electrical conductor positioned in a linking relation with the magnetic flux path of said first stator element by being disposed between said airgap and low reluctance flux path thereof, and in a nonlinking relation with the magnetic flux path of said second stator element by being disposed in the region outside of the airgap and low reluctance flux path thereof;
VI. a second electrical conductor positioned in a linking relation with the magnetic flux path of said second stator element by being disposed between said airgap and low reluctance flux path thereof; and
VII. a third electrical conductor positioned in a linking relation with the magnetic flux paths of both said stator elements by being disposed between said airgaps and low reluctance flux paths thereof;
 a. whereby each of said stator elements is linked by a different pair of said electrical conductors.

14. The combination of claim 13 wherein said first stator element is one of a first set of stator elements; said second stator element is one of a second set of stator elements; said first electrical conductor links only the stator elements of said first set; said second electrical conductor links only the stator elements of said second set; and said third electrical conductor links all the stator elements of both sets.

15. The combination of claim 13 wherein said low reluctance flux path of each stator element comprises:
a substantially C-shaped structure of magnetic material, having a yoke portion;
two side portions, each side portion being in magnetic continuity with respective ends of said yoke portion;
a pole piece having one of said pole faces in magnetic continuity with the other end of one of said side portions;
the pole face of said pole piece forming with the other pole face of said airgap across which a concentrated magnetic flux may be formed to cooperate with a motive tooth in the vicinity of said gap; and
the interior portion of said C-shaped stator element serving as a passageway for the respective electrical conductors.

16. The combination of claim 15 including a second pole piece having the other pole face in magnetic continuity with the other end of the other side portion, the pole faces of the two pole pieces forming the gap.

17. An electrical machine comprising:
a first group of E-shaped dual stator elements each having a primary C-shaped portion and a secondary C-shaped portion, said primary and secondary portions having spaced-apart airgaps, said primary and secondary portions having individual magnetic paths that include their individual airgaps;
a second group of substantially identical E-shaped dual stator elements;
said first and second stator elements positioned with their primary airgaps aligned, and with their secondary airgaps aligned;
a first electrical conductor positioned within said primary C-shaped portions;
a second electrical conductor positioned within said secondary C-shaped portions;
a third electrical conductor positioned within the primary C-shaped portion of only said first stator element;
a fourth electrical conductor positioned within the secondary C-shaped portion of said first stator element, and the primary C-shaped portion of said second stator element;
a fifth electrical conductor positioned within the secondary portion of only said second stator element;

a first motive element having a motive tooth mounted for movement through the aligned primary air gaps; and a second motive element having a motive tooth mounted for movement through the aligned secondary airgaps.

18. The combination of claim 17 including:

means for causing said first and second electrical conductors to produce a unidirectional magnetic flux across the airgaps of said stator elements;

means for causing said third electrical conductor to produce, across the primary gap of said first stator element, a magnetic flux that varies periodically, the composite magnetic flux produced at said airgap by said first and third electrical conductors varying from maximum value to a value of substantially zero;

means for causing said fourth electrical conductor to produce, across the primary gap of said second stator element and the second gap of said first stator element, magnetic fluxes that vary periodically, the composite magnetic flux produced at said air gaps by said second and fourth electrical conductors varying from a maximum value to a value of substantially zero;

a first group of motive teeth on said first motive element and including the single motive tooth positioned to move through said aligned primary gaps; and a second group of motive teeth on said second motive element and including the single motive tooth positioned to move through said aligned secondary gaps.

19. The combination of claim 18, including means for causing the magnetic flux variations in said primary gaps to be out of phase, and the magnetic flux variation in said secondary gaps to be out of phase—whereby a motive tooth of the first group is drawn into one primary gap during said gap's maximum flux value interval; and a motive tooth of the second group is drawn into one secondary gap during said gap's maximum flux value interval, and is drawn into the outer secondary gap during that gap's maximum flux value interval.

20. The combination of claim 18 including:

means for moving said motive teeth sequentially through said respective gaps for causing said teeth movement to produce varying voltages in said third, fourth, and fifth electrical conductors.

21. The combination comprising:

A. a first stator element having an airgap, and defining a magnetic flux path within said first stator element and through the airgap of said first stator element;

B. a second stator element having an airgap, and defining a magnetic flux path within said second stator element and through the airgap of said second stator element;

C. said stator elements mounted around a circle with their airgaps substantially aligned, said stator elements comprising:
   I. a substantially C-shaped structure of magnetic material, having;
      a. a yoke portion,
      b. two side portions, each side portion being in magnetic continuity with respective ends of said yoke portion,
      c. a first pole piece in magnetic continuity with the other end of the other one of said side portions,
      d. a second pole piece in magnetic continuity with the other end of the other one of said side portions,
      e. the faces of the poles pieces forming the airgap across which a concentrated magnetic flux may be formed to cooperate with a motive tooth moving in the vicinity of said gap, and
      f. the interior portion of said C-shaped stator element serving as a passageway for electrical conductors;

D. means for linking each of said stator elements by a different pair of electrical conductors, comprising:
   a. a first electrical conductor positioned within the interior portion of said C-shaped first stator element, and exterior of said C-shaped second stator element;
   b. a second electrical conductor positioned within the interior portion of said C-shaped second stator element, and exterior of the C-shaped first stator element; and
   c. a third electrical conductor positioned within the interior of both said C-shaped stator elements.

22. A machine comprising:

a rotor mounted for rotation on an axis and having a plurality of teeth protruding radially therefrom;

a plurality of C-shaped elements made of magnetic material and each having a pair of facing poles forming an airgap;

said elements being disposed in a circle around said axis with the airgaps aligned with the axis;

means for magnetizing said elements;

said rotor and said elements being disposed so that each tooth passes through the airgaps as said rotor rotates; and a toroidal coil passing through the central opening of some of said C-shaped elements so that an electromotive force is induced therein, whenever a tooth passes through the airgap of the respective element, that said coil passes through.